United States Patent [19]

Lorah et al.

[11] Patent Number: 5,326,843

[45] Date of Patent: Jul. 5, 1994

[54] METHOD FOR MAKING AN ALKALI-SOLUBLE EMULSION COPOLYMER

[75] Inventors: Dennis P. Lorah, Lansdale; Thomas G. Madle, Flourtown, both of Pa.

[73] Assignee: Rohm and Haas Company, Philadelphia, Pa.

[21] Appl. No.: 130,971

[22] Filed: Oct. 4, 1993

[51] Int. Cl.$^5$ ............................................ C08F 20/06
[52] U.S. Cl. ................................ 526/318.6; 526/347; 526/937
[58] Field of Search ................. 526/318.6, 347, 937

[56] References Cited

U.S. PATENT DOCUMENTS

| | | | |
|---|---|---|---|
| 4,081,418 | 3/1978 | Barua et al. | 526/318.6 |
| 4,628,071 | 12/1986 | Morgan | 526/318.6 |
| 5,122,568 | 6/1992 | de Pierne et al. | 526/318.6 |

FOREIGN PATENT DOCUMENTS

| | | | |
|---|---|---|---|
| 47-606 | 1/1972 | Japan | 526/318.6 |

OTHER PUBLICATIONS

Alkali Soluble Styrene/Acrylic Acid Emulsion Polymers, L. W. Morgan, D. P. Jensen, C. W. Weiss, S. C. Johnson & Son, Inc., Polymer Research & Analytical Research Departments, pp. 689 through 694.

Primary Examiner—Joseph L. Schofer
Assistant Examiner—N. Sarofin
Attorney, Agent, or Firm—Kevin E. McVeigh

[57] ABSTRACT

An emulsion polymerization process for making a low molecular weight alkali-soluble copolymer of a water insoluble monoethylenically unsaturated aromatic monomer and methacrylic acid, includes heating an aqueous reaction mixture, said reaction mixture having a pH of less than or equal to about 4.5 and including from about 25 parts by weight to about 75 parts by weight of the water insoluble monoethylenically unsaturated aromatic monomer; from about 25 parts by weight to about 75 parts by weight methacrylic acid; a polymerization initiator; a reducing agent; a catalyst effective for promoting decomposition of the polymerization initiator in the presence of the reducing agent; and an amount of a chain transfer agent effective to limit copolymer weight average molecular weight to a range of about 2,000 to about 40,000; to a temperature greater than or equal to about 75° C.; and maintaining the reaction mixture at a temperature greater than or equal to about 75° C. for a period of time effective to allow formation of the copolymer.

27 Claims, No Drawings

METHOD FOR MAKING AN ALKALI-SOLUBLE EMULSION COPOLYMER

TECHNICAL FIELD

The present invention is directed to emulsion copolymers, more particularly to low molecular weight alkali-soluble emulsion copolymers, and to methods for making such copolymers.

BACKGROUND

Low molecular weight, alkali-soluble copolymers are used in inks, floor finishes, paper coatings, paints and adhesives. The copolymers are produced by bulk or solution copolymerization of a water insoluble monomer and a water soluble monomer. Acrylic acid and methacrylic acid are commonly used to introduce solubilizing functionality into such copolymers.

Emulsion polymerization offers a particularly desirable process for making such polymers because the process is free of residual solvents and the polymer produced can be solubilized directly from the emulsion by addition of base. However, the emulsion route presents a significant problem with respect to maintaining a high polymerization rate when using high levels of chain transfer agent to obtain a product having a low molecular weight.

U.S. Pat. No. 4,628,071 discloses an aqueous emulsion process for preparing a low molecular weight alkali-soluble resin from a water insoluble vinylic monomer and acrylic acid. However, substitution of methacrylic acid for acrylic acid in the method disclosed in the '071 patent is said to produce an unsatisfactory product.

SUMMARY OF THE INVENTION

An emulsion polymerization process for making a low molecular weight alkali-soluble copolymer of a water insoluble monoethylenically unsaturated aromatic monomer and methacrylic acid is disclosed. The process includes heating an aqueous reaction mixture, said reaction mixture having a pH of less than or equal to about 4.5 and including from about 25 parts by weight to about 75 parts by weight of a water insoluble monoethylenically unsaturated aromatic monomer; from about 25 parts by weight to about 75 parts by weight of methacrylic acid; a polymerization initiator; a reducing agent; a catalyst effective for promoting decomposition of the polymerization initiator in the presence of the reducing agent; and an amount of a chain transfer agent effective to limit copolymer weight average molecular weight to a range of about 2,000 to about 40,000; to a temperature greater than or equal to about 75° C. and maintaining the reaction mixture at a temperature greater than or equal to about 75° C. for a period of time effective to allow copolymerization of the water insoluble ethylenically unsaturated monomer and the methacrylic acid.

DETAILED DESCRIPTION OF THE INVENTION

In the emulsion polymerization process of the present invention, a water insoluble monoethylenically unsaturated aromatic monomer is copolymerized with methacrylic acid at low pH in the presence of a polymerization initiator, a reducing agent, a catalyst for promoting decomposition of the initiator in the presence of the reducing agent and a chain transfer agent.

Suitable water insoluble monoethylenically unsaturated aromatic monomers are those having at least one aromatic ring per molecule, having a single ethylenically unsaturated site per molecule and having a solubility in water of less than about 0.5 weight percent (wt %). Suitable ethylenically unsaturated aromatic monomers include, for example, styrene, styrene, alpha-methyl styrene, vinyl toluene, vinyl xylene, ethyl vinyl benzene, vinyl benzyl chloride, vinyl naphthalene and mixtures thereof.

In a preferred embodiment, the reaction mixture includes from about 25 parts by weight (pbw) to about 75 pbw water insoluble monoethylenically unsaturated aromatic monomer and about 25 pbw to about 75 pbw methacrylic acid.

The reaction mixture may optionally include a minor amount, for example, up to about 30 pbw per 100 pbw total monomers, of a water insoluble, that is, having a solubility in water of less than about 5.0 wt %, monoethylenically unsaturated non-aromatic monomer. Suitable water insoluble monoethylenically unsaturated non-aromatic monomers include, for example, ethyl acrylate, methyl methacrylate, ethyl methacrylate, butyl acrylate, butyl methacrylate and mixtures thereof.

Suitable polymerization initiators include water soluble free radical anionic initiators, for example, ammonium persulfate (APS), sodium persulfate, potassium persulfate and mixtures thereof. Other polymerization initiators such as, for example, hydroperoxides, diacyl peroxides, dialkyl peroxydicarbonates, ketone peroxides, azonitriles and mixtures thereof, may be used in addition to the water soluble anionic free radical initiator.

In a preferred embodiment, the polymerization initiator is an anionic free radical initiator selected from the group consisting of ammonium persulfate, sodium persulfate, potassium persulfate and mixtures thereof.

The reaction mixture includes an amount of polymerization initiator effective to initiate, copolymerization of the water insoluble monoethylenically unsaturated In a preferred embodiment, the reaction mixture includes from about 0.4 pbw to about 2 pbw initiator per 100 pbw of the total amount of monomers, that is, per 100 pbw of the combined water insoluble monoethylenically unsaturated aromatic monomer, the methacrylic acid and any water insoluble monoethylenically unsaturated non-aromatic monomer.

Suitable reducing agents are those which increase the rate of polymerization and include for example, sodium bisulfite, sodium hydrosulfite, sodium formaldehyde sulfoxylate, ascorbic acid, isoascorbic acid and mixtures thereof.

In a preferred embodiment, the reaction mixture includes from about 10 pbw to about 100 pbw reducing agent per 100 pbw polymerization initiator.

Suitable catalysts are those compounds which increase the rate of polymerization and which, in combination with the above described reducing agent, promote decomposition of the polymerization initiator under the reaction conditions. Suitable catalysts include transition metal compounds such as, for example, ferrous sulfate heptahydrate, ferrous chloride, cupric sulfate, cupric chloride, cobaltic acetate, cobaltous sulfate and mixtures thereof.

In a preferred embodiment, the reaction mixture includes from about 0.06 pbw to about 0.25 pbw catalyst per 100 pbw polymerization initiator.

In a preferred embodiment, the reaction mixture further includes a surfactant. Suitable surfactants include anionic surfactants and nonionic surfactants.

Suitable anionic surfactants include, for example, alkyl phenol ethoxysulfates, alkyl sulfates, alkyl sulfonates, alkyl aryl sulfonates, monoalkyl sulfosuccinates and mixtures thereof.

Suitable nonionic surfactants include, for example, alkyl phenol ethoxylates, alkyl ethoxylates and mixtures thereof.

In a highly preferred embodiment, the surfactant has a hydrophilic/lipophilic balance (HBL) of greater than or equal to about 10.

The reaction mixture includes an amount of the surfactant that is effective to stabilize the emulsion. In a preferred embodiment, the reaction mixture includes from about 0.25 pbw to about 2.5 pbw surfactant per 100 pbw total monomers.

The reaction mixture includes an amount of chain transfer agent effective to provide a copolymer having a molecular weight within a desired range.

Suitable chain transfer agents include, for example, alkyl mercaptans such as, for example, octyl mercaptan and decyl mercaptan, esters of mercapto acetic acid, such as, for example, ethyl ester of mercapto acetic acid and 2-ethylhexyl ester of mercapto acetic acid, and esters of mercapto propionic acid, such as, for example, isooctyl ester of mercaptopropionic acid.

In a preferred embodiment, the chain transfer agent is slightly water soluble, that is, having a water solubility of greater than 0 pbw and less than about 5 pbw chain transfer agent per 100 pbw water, such as, for example, methyl 3-mercaptopropionate, butyl 3-mercaptopropionate, ethyl ester of mercapto acetic acid, 2-ethylhexyl ester of mercapto acetic acid, isooctyl ester of mercaptopropionic acid or a mixture thereof.

In a highly preferred embodiment, the chain transfer agent is methyl 3-mercaptopropionate, butyl 3-mercaptopropionate or a mixture thereof.

In a preferred embodiment, the reaction mixture includes from about 0.5 pbw to about 12 pbw chain transfer agent per 100 pbw total monomers and the low molecular weight alkali soluble product of the process exhibits a weight average molecular weight from about 2,000 to about 40,000 and a number average molecular weight from about 800 to about 16,000.

In a highly preferred embodiment, the reaction mixture includes from about 1.5 pbw to about 12 pbw chain transfer agent per 100 pbw total monomers and the low molecular weight alkali soluble product of the process exhibits a weight average molecular weight frown about 2,000 to about 16,000 and a number average molecular weight from about 800 to about 6400.

The process of the present invention is carried out at low pH, that is, a pH of less than or equal to about 4.5, to reduce those forces tending to drive methacrylic acid into the aqueous phase.

In a preferred embodiment, the reaction mixture has a pH of about 1.5 to about 3 and, even more preferably, a pH of about 1.7 to about 2.3.

The low molecular weight alkali-soluble copolymer of the present invention is made by heating an aqueous reaction mixture having a pH of less than or equal about 4.5 and including the monoethylenically unsaturated aromatic monomer, methacrylic acid, the polymerization initiator, the reducing agent and the catalyst to a temperature greater than or equal to about 75° C. and then maintaining the reaction mixture at a temperature greater than or equal to about 75° C. for a period of time effective to allow formation of the copolymer.

In a preferred embodiment, a mixture of water and surfactant is heated to a temperature greater than or equal to about 75° C. in a reaction vessel and introducing a water insoluble ethylenically unsaturated monomer, methacrylic acid, a polymerization initiator, a reducing agent, a catalyst and a chain transfer agent to the reaction vessel and maintaining the contents of the reaction vessel at a temperature greater than or equal to about 75° C. for a period of time effective to allow copolymerization of the water insoluble ethylenically unsaturated monomer and the methacrylic acid.

In a preferred embodiment, the reaction mixture is maintained at the reaction temperature solely by the heat generated by the exothermic polymerization reaction.

In a preferred embodiment, at least a portion of the water insoluble ethylenically unsaturated monomer the methacrylic acid and the chain transfer agent are fed to the reaction vessel at a controlled rate during the polymerization reaction. In a preferred embodiment, the monomers and chain transfer agent are introduced to the reaction vessel as a concentrated monomer emulsion. The concentrated monomer emulsion is formed, for example, by sequentially dispersing from about 75 pbw to about 150 pbw surfactant, then from about 4400 pbw to about 4500 pbw water insoluble monomer then from about 4400 pbw to about 4500 pbw methacrylic acid and then from about 530 pbw to about 550 pbw chain transfer agent in about 4800 pbw to about 4900 pbw deionized water. It is preferred that the pH of the deionized water be reduced to below about 4.3 by addition of an effective amount of an acid compound, for example, acetic acid or phosphoric acid, prior to introducing the monomers.

In a preferred embodiment, at least a portion of the polymerization initiator is fed to the reaction vessel at a controlled rate during the polymerization reaction.

In a highly preferred embodiment, a seeded emulsion technique is used to make the alkali-soluble particles. In the seeded emulsion technique, a reaction vessel is initially charged with reactants for making polymeric seed particles. From about 3400 pbw to about 3500 pbw deionized water is heated in the reaction vessel to a temperature of about 86° C. to about 88° C. From about 60 pbw to about 65 pbw surfactant is then dispersed in the heated water and external heating of the reaction vessel is discontinued. From about 150 pbw to about 700 pbw of the above-described concentrated monomer emulsion is then added to the reaction vessel. The temperature of the mixture in the reaction vessel is stabilized at a temperature within a reaction temperature range of about 80° C. to about 82° C. From about 0.08 pbw to about 0.10 pbw catalyst, from about 20 pbw to about 24 pbw polymerization initiator and from about 20 pbw to about 24 pbw reducing agent are then added to the reaction vessel. Immediately subsequent to addition of the reducing agent, a feed of a solution of polymerization initiator into the reaction vessel is begun. The temperature of the seed charge will increase as the exothermic formation of copolymeric seed particles progresses.

Immediately after the seed charge exhibits a peak exotherm, reactant feed streams of the remaining concentrated monomer emulsion and an aqueous solution of the polymerization initiator are simultaneously fed into the reaction vessel, while maintaining the contents of the reaction vessel at a temperature within the reaction temperature range. After the feed streams are exhausted, the temperature of the contents of the reaction vessel is maintained at a temperature within the reaction temperature range for a period of time effective to allow copolymerization of the water insoluble monomer and the methacrylic acid.

In a preferred embodiment, each of the feed streams is fed to the reaction vessel at a respective substantially uniform rate over a time period of about 1.5 hours to about 4 hours and the reaction vessel contents are maintained at a temperature within a reaction temperature range of about 85° C. to 90° C. for a time period of about 0.5 to about 1.0 hours subsequent to exhaustion of the reactant feed streams.

The contents of the reaction vessel are then cooled and filtered to provide the product emulsion.

Additives, for example, defoamers, buffers, biocides, may, optionally be added to the product emulsion in a manner known in the art.

In a preferred embodiment, the product emulsion is converted to an aqueous resin cut solution by adding to the emulsion an amount of an alkaline compound effective to raise the pH of the emulsion to greater than or equal to about 8, thereby solubilizing the alkali-soluble copolymer of the emulsion. Suitable alkaline compounds include, for example, sodium hydroxide, potassium hydroxide, diethanolamine, triethylamine monoethanolamine and aqueous ammonia, that is, an aqueous solution of ammonium hydroxide.

In a preferred embodiment, the alkaline compound is aqueous ammonia.

In a highly preferred embodiment, the resin cut solution has a relatively high polymer solids level, for example, greater than about 20 wt %, and, preferably, about 28 wt % to about 32 wt % polymer solids and has a low viscosity, for example, a viscosity of less than or equal to about 1000 centiPoise at 25° C.

EXAMPLE 1

A monomer emulsion was formed as follows. An aqueous phase was made by adding, with stirring, a surfactant (205.0 grams (g) 58% aqueous TRITON XN-45S, Union Carbide) to 4,869.0 g deionized water (pH =6). The aqueous mixture was stirred for an additional 10 minutes to disperse the surfactant. A water insoluble ethylenically unsaturated monomer (4,500.0 g styrene) was then added, with stirring, to the aqueous phase. The mixture was stirred for an additional 10 minutes to disperse the monomer phase in the aqueous phase, thereby forming a creamy white emulsion. Methacrylic acid (4,500.0 g) was then added, with stirring, to the emulsion. The emulsion was then stirred for an additional 15 minutes to disperse the methacrylic acid in the emulsion. A chain transfer agent (540.0 g methyl 3-mercaptopropionate)was then added, with stirring, to the emulsion. The emulsion was stirred an additional 15 minutes to disperse the chain transfer agent.

A reaction was run to provide copolymeric seed particles. Deionized water (3,470 g, pH =6) was heated to 86° C. in a 20 liter reaction vessel equipped with cooling and a reflux condenser. A surfactant (110.0 g 58% aqueous TRITON XN-45S) was added, with stirring, to the heated water. The mixture was stirred for an additional 10 minutes to disperse the surfactant and external heating of the reaction vessel was discontinued. A portion of the monomer emulsion (733.0 g) was then immediately added to the reaction vessel. The addition of the portion of the monomer emulsion dropped the temperature of the reaction vessel contents to about 82° C. A catalyst (60.0 g 0.15% aqueous $FeSO_4.7H_2O$), then a polymerization initiator (22.5 g ammonium persulfate in 50 g deionized water) and then a reducing agent (22.5 g sodium bisulfite in 50 g deionized water) were added to the reaction vessel without any delay between additions. Immediately upon completion of the above listed additions to the reaction vessel, a first initiator feed stream was begun wherein a stream of initiator solution (40.5 g ammonium persulfate initiator in 500.0 g deionized water) was fed to the reaction vessel at a rate of 9.0 grams per minute (g/min).

The reaction mixture exhibited an exotherm wherein the temperature of the reaction mixture increased from about 78° C. to a peak of about 90° C. in about 10 minutes.

Upon reaching the peak exotherm, a monomer feed stream was begun, wherein a stream of the remaining monomer emulsion was fed to the reaction vessel at a rate of 59.2 g/min.

Upon exhaustion of the first initiator stream, a second initiator feed stream was begun, wherein a stream of initiator solution (9.0 g ammonium persulfate initiator in 261.0 g deionized water) was fed to the reaction vessel at a rate of 3.0 g/min and the monomer emulsion feed rate was increased to 116.8 g/min. The temperature was maintained between 86° C. and 90° C. during the addition by cooling the reaction vessel as needed.

Upon completion of the second initiator feed stream, the reaction mixture was held at 85° C. to 90° C. for 30 minutes and then cooled to 65° C.

The product emulsion so formed was then cooled to room temperature and filtered, first through a 100 mesh screen and then through a 325 mesh screen. Filtration was rapid and only a very small amount of gel particles (<0.01 grams gel particles/quart product emulsion filtered) were collected on the screens.

The product emulsion exhibited a pH of 2.3 and a polymer solids content of 50.1 (99% of theoretical conversion).

The polymer particles of the product emulsion exhibited a weight average particle size of 161 nanometers as determined using a Brookhaven B.I. 90 Particle Analyzer.

Polymer particles of the product emulsion exhibited a weight average molecular weight of 3,730, a number average molecular weight of 1,750, each determined by gel permeation chromatography. The polymer particles were prepared for molecular weight analysis by deionizing a sample of the product emulsion by contacting the emulsion with an ion exchange resin (IRN-150, Rohm and Haas Company), freeze drying the deionized emulsion to obtain dried polymer particles and then dissolving the dried polymer particles in tetrahydrofuran.

Polymer particles of the product emulsion exhibited a glass transition temperature of 172.3° C. as determined by differential scanning calorimetry (1 milligram Sample, no preheat, scanning 50° C. to 250° C. at 20° C. per minute) using polymer particles that had been deionized and freeze dried as described above in the discussion of the molecular weight measurements.

A sample of the product emulsion containing 28 grams polymer solids was diluted to 31.4% polymer solids with deionized water and solubilized by addition of 10.9 g of concentrated (28%) ammonium hydroxide (1.1 equivalents ammonium hydroxide per equivalent methacrylic acid). The solubilized sample exhibited a pH of 9.75, a Brook field viscosity (#4 spindle at 60 revolutions per minute) of 750 centiPoise, was clear in appearance and had a nonvolatile content of 28 wt %.

The process of the present invention exhibits a high polymerization rate in presence of an amount of chain transfer agent effective to provide a low molecular weight copolymer.

A high rate of polymerization encourages formation of emulsion copolymer particles that have a relatively homogeneous composition and that form resin cut solutions that are clear in appearance and free from haziness and turbidity. In contrast, a sluggish polymerization rate encourages formation of relatively heterogeneous particles, in an extreme example, particles having a core of hydrophobic polymer and a shell of hydrophilic polymer, due to partitioning of hydrophobic monomer into the hydrophobic phase and of the hydrophilic monomer into the aqueous phase of the emulsion. Such relatively heterogeneous particles tend to form resin cut solutions that are viscous, hazy and turbid. The appearance and performance of polymer films cast from turbid resin cut solutions tend to be inferior to those of films cast from clear resin cut solutions.

A relatively high level of chain transfer agent in the reaction mixture of the process of the present invention is required to produce the desired low molecular weight copolymeric product, but, in an extreme example, a high level of chain transfer agent can stall an otherwise sluggish polymerization reaction. The ability to use relatively high amounts of chain transfer agent in the polymerization process of the present invention without stalling the polymerization reaction allows improved control of the molecular weight of the copolymeric product and production of a low molecular weight copolymer. The molecular weight of the copolymer product inversely correlates with the maximum nonvolatile content of the neutralized resin cuts that can be made from the product, that is, a copolymeric product having a relatively low molecular weight can readily be used to form resin cut solutions having relatively high nonvolatile levels. A resin cut solution having a relatively high nonvolatile level provides performance advantages, for example, faster drying time, and reduced shipping costs (on a polymer solids basis) than an otherwise identical resin cut solution having a relatively low nonvolatile level.

In a preferred embodiment, the process of the present invention is self-sustaining, that is, once the polymerization reaction is started, for example, by externally heating the reaction mixture to an elevated reaction temperature, the polymerization rate is such that the exothermic polymerization reaction generates sufficient heat to maintain the reaction mixture at the reaction temperature without continued external heating. The avoidance of continued external heating minimizes the risks of "runaway" polymerization, that is, of a sudden, uncontrollable acceleration of the polymerization rate, and of environmental contamination, that is, of escape of reactant from the reaction vessel.

The advantages of the process of the present invention are illustrated by comparison of the present process with the process disclosed in the above discussed U.S. Pat. No. 4,628,071 (Morgan).

Morgan teaches that there is a reduction in polymerization rate and an increase in steady state monomer level with increasing level of chain transfer agent (col. 7, lines 24-29). The highest amount of chain transfer agent set forth in the working examples of Morgan is 2 wt % and the lowest molecular weight copolymer made in those examples had a weight average molecular weight of 16,830 (col. 120, lines 64-68). Morgan generically discloses resin cut solutions having nonvolatile levels of 10% to 20% (col. 8, lines 23-25) and working examples having a nonvolatile content of 5% (see, e.g., col. 9, lines 30, 43, 57).

In contrast, the exemplary copolymer of the present application exhibited a molecular weight of 3,730 and was used to form a low viscosity, clear, that is, non-turbid, resin cut solution having a nonvolatile content of 28%.

We claim:

1. An emulsion polymerization process for making a low molecular weight alkali-soluble copolymer of a water insoluble monoethylenically unsaturated aromatic monomer and methacrylic acid, comprising:
   heating an aqueous reaction mixture, said reaction mixture having a pH of less than or equal to about 4.5 and comprising:
   from about 25 parts by weight to about 75 parts by weight of the water insoluble monoethylenically unsaturated aromatic monomer;
   from about 25 parts by weight to about 75 parts by weight of methacrylic acid;
   a polymerization initiator;
   a reducing agent;
   a catalyst effective for promoting decomposition of the polymerization initiator in the presence of the reducing agent; and
   an amount of a chain transfer agent effective to limit copolymer weight average molecular weight to a range of about 2,000 to about 40,000;
   to a temperature greater than or equal to about 75° C.; and
   maintaining the reaction mixture at a temperature greater than or equal to about 75° C. for a period of tinge effective to allow formation of the copolymer.

2. The process of claim 1, wherein the water insoluble ethylenically unsaturated monomer is selected from the group consisting of styrene, alpha-methyl styrene, vinyl toluene, vinyl xylene, ethyl vinyl benzene, vinyl benzyl chloride, vinyl naphthalene and mixtures thereof.

3. The process of claim 1, wherein the water insoluble ethylenically unsaturated monomer comprises styrene.

4. The process of claim 1, wherein the reaction mixture comprises from about 40 parts by weight to about 60 parts by weight of the water insoluble ethylenically unsaturated monomer and from about 40 parts by weight to about 60 parts by weight of methacrylic acid.

5. The process of claim 1, wherein the polymerization initiator is selected from the group consisting of ammonium persulfate, sodium persulfate, potassium persulfate and mixtures thereof.

6. The process of claim 1, wherein the polymerization initiator comprises ammonium persulfate.

7. The process of claim 1, wherein the emulsion comprises from about 0.4 parts by weight to about 2.0 parts by weight polymerization initiator per 100 parts by weight water insoluble ethylenically unsaturated monomer and methacrylic acid combined.

8. The process of claim 1, wherein the reducing agent is selected from the group consisting of sodium bisulfite, ascorbic acid, isoascorbic acid, sodium formaldehyde sulfoxylate, sodium hydrosulfite and mixtures thereof.

9. The process of claim 1, wherein the reducing agent comprises sodium bisulfite.

10. The process of claim 1, wherein the reaction mixture comprises from about 10 parts by weight to about 100 parts by weight reducing agent per 100 parts by weight polymerization initiator.

11. The process of claim 1, wherein the catalyst is a transition metal compound selected from the group consisting of ferrous sulfate heptahydrate, ferrous chloride, cupric sulfate, cupric chloride, cobaltic acetate, cobaltous sulfate and mixtures thereof.

12. The process of claim 1, wherein the catalyst comprises ferrous sulfate heptahydrate.

13. The process of claim 1, wherein the reaction mixture comprises from about 0.06 parts by weight to about 0.25 parts by weight catalyst per 100 parts by weight polymerization initiator.

14. The process of claim 1, wherein the chain transfer agent is selected from the group consisting of alkyl mercaptans, esters of mercapto acetic acid and esters of mercapto propionic acid and mixtures thereof.

15. The process of claim 14, wherein the chain transfer agent is selected from the group consisting of methyl 3-mercaptopropionate, butyl 3-mercaptopropionate, ethyl ester of mercapto acetic acid, 2-ethylhexyl ester of mercapto acetic acid, isooctyl ester of mercaptopropionic acid and mixtures thereof.

16. The process of claim 1, wherein the amount of chain transfer agent is effective to limit copolymer weight average molecular weight to a range of about 2,000 to about 16,000.

17. The process of claim 16, wherein the reaction mixture includes about 1.5 parts by weight to about 12 parts by weight chain transfer agent per 100 parts by weight water insoluble ethylenically unsaturated monomer and methacrylic acid combined.

18. The process of claim 1, wherein the reaction mixture further comprises an anionic surfactant or a nonionic surfactant.

19. The process of claim 18, wherein the surfactant comprises an alkyl phenol ethoxysulfate surfactant.

20. The process of claim 1, water is heated in a reaction vessel to a temperature greater than or equal to about 75° C. and the water insoluble ethylenically unsaturated monomer, methacrylic acid, polymerization initiator, reducing agent, catalyst and chain transfer agent are added to the heated water in the reaction vessel.

21. The process of claim 1, wherein at least a portion of the water insoluble ethylenically unsaturated monomer and methacrylic acid is added to the reaction mixture at a controlled rate during the step of maintaining the temperature.

22. The process of claim 21, wherein at least a portion of the polymerization initiator is introduced into the reaction mixture at a second controlled rate during the step of maintaining the temperature.

23. The process of claim 21, wherein the heating is conducted in a reaction vessel and the reducing agent, the catalyst and respective first portions of the water insoluble ethylenically unsaturated monomer, the methacrylic acid, chain transfer agent and the polymerization initiator are initially charged to the reaction vessel and heated to form polymeric seed particles and the respective remainders of the water insoluble ethylenically unsaturated monomer, the methacrylic acid and the polymerization initiator are then simultaneously fed to the reaction vessel at respective controlled rates while maintaining the reaction mixture at a temperature greater than or equal to about 75° C.

24. The process of claim 1, wherein the emulsion is maintained at a temperature from about 80° C. to about 90° C.

25. The process of claim 1, wherein file emulsion is maintained at a temperature greater than or equal to about 75° C. solely by heat generated by copolymerization of the ethylenically unsaturated monomer and the methacrylic acid.

26. The process of claim 1, wherein the pH of the reaction mixture is from about 1.5 to about 3.

27. The process of claim 1, wherein the pH of the reaction mixture is from about 1.7 to about 2.3.

* * * * *

UNITED STATES PATENT AND TRADEMARK OFFICE
CERTIFICATE OF CORRECTION

PATENT NO. : 5,326,843

DATED : July 5, 1994

INVENTOR(S) : D. P. Lorah, T. G. Madle

It is certified that error appears in the above-identified patent and that said Letters Patent is hereby corrected as shown below:

Column 2, line 41 after "unsaturated" it should read: -- aromatic monomer and the methacrylic acid monomer.--

Column 10, line 33: "File" should be --the--

Signed and Sealed this

Fourth Day of October, 1994

Attest:

BRUCE LEHMAN

Attesting Officer

Commissioner of Patents and Trademarks